(12) United States Patent
Venuturumilli

(10) Patent No.: US 10,380,874 B2
(45) Date of Patent: Aug. 13, 2019

(54) SMART WIRELESS ASSET TRACKING

(71) Applicant: Microchip Technology Incorporated, Chandler, AZ (US)

(72) Inventor: Abhinay Venuturumilli, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 2 days.

(21) Appl. No.: 15/215,791

(22) Filed: Jul. 21, 2016

(65) Prior Publication Data

US 2017/0024997 A1    Jan. 26, 2017

Related U.S. Application Data

(60) Provisional application No. 62/195,639, filed on Jul. 22, 2015.

(51) Int. Cl.
*G08B 25/10* (2006.01)
*G06Q 10/08* (2012.01)
(Continued)

(52) U.S. Cl.
CPC ......... *G08B 25/10* (2013.01); *G06Q 10/0833* (2013.01); *G06Q 50/28* (2013.01); *H04W 52/36* (2013.01)

(58) Field of Classification Search
CPC .... G06Q 10/0833; G06Q 10/08; G06Q 50/28; G06C 50/28; G08B 25/10; G08B 13/2462; H04W 4/008; G06K 19/0723
See application file for complete search history.

(56) References Cited

U.S. PATENT DOCUMENTS 9,641,964 B2 * 5/2017 Kulkarni ............ H01Q 1/24
2002/0183979 A1 * 12/2002 Wildman ........... G06K 7/0008
702/188
(Continued)

FOREIGN PATENT DOCUMENTS

WO    2014/068366 A1    5/2014    ......... G01S 1/04

OTHER PUBLICATIONS

International Search Report and Written Opinion, Application No. PCT/US2016/043465, 12 pages, dated Oct. 17, 2016.

*Primary Examiner* — Mirza F Alam
(74) *Attorney, Agent, or Firm* — Slayden Grubert Beard PLLC

(57) ABSTRACT

Systems and methods for localizing a bad condition in a crowded asset environment include providing a plurality of wireless transceivers associated with a sensor monitoring a condition of an asset, wherein each of the plurality of wireless transceivers in a long range operating mode adjusts the transmission power to a high output power, monitoring the conditions of the assets using the long range operating mode with a sensor receiver, communicating an alarm to the sensor receiver by at least one of the plurality of wireless transceiver, transmitting by the sensor receiver a command to all of the plurality of wireless transceivers to switch to a low transmission power output to allow a localization of the item, switching each of the plurality of wireless transceivers to operate in a localization operating mode, wherein the transmission power is set to a low output power, and localizing the sensor generating the alarm.

20 Claims, 4 Drawing Sheets

(51) Int. Cl.
*G06Q 50/28* (2012.01)
*H04W 52/36* (2009.01)

(56) References Cited

U.S. PATENT DOCUMENTS

| | | | | |
|---|---|---|---|---|
| 2006/0244588 A1* | 11/2006 | Hannah | A47F 10/04 | |
| | | | 340/539.13 | |
| 2009/0124304 A1* | 5/2009 | Twitchell, Jr. | G06Q 10/08 | |
| | | | 455/574 | |
| 2014/0111019 A1* | 4/2014 | Roy | G01V 3/081 | |
| | | | 307/104 | |
| 2014/0206411 A1 | 7/2014 | Ruutu et al. | 455/522 | |
| 2014/0361906 A1 | 12/2014 | Hughes et al. | 340/870.01 | |
| 2015/0002274 A1* | 1/2015 | Sengstaken, Jr. | G06K 7/10009 | |
| | | | 340/10.34 | |
| 2016/0086191 A1* | 3/2016 | Fonzi | G06Q 30/016 | |
| | | | 705/304 | |
| 2017/0066464 A1* | 3/2017 | Carter | B60T 7/12 | |

* cited by examiner

SMART WIRELESS ASSET TRACKING

CROSS-REFERENCE TO RELATED APPLICATIONS

This application claims priority to commonly owned U.S. Provisional Patent Application No. 62/195,639 filed Jul. 22, 2015, which is hereby incorporated by reference herein for all purposes.

TECHNICAL FIELD

The present disclosure relates to wireless tracking, in particular to smart wireless asset tracking.

BACKGROUND

Certain environments that implement wireless asset tracking experience crowding of assets that may hamper tracking of those assets. For example, applications such as refrigerated trucks shipping perishable goods and pharmaceuticals typically have multiple wireless sensors in the back of the truck. These sensors need to have enough range to send their attributes, such as temperature, humidity, etc. to a sensor receiver. If there is a problem with any one of the transmitted values, it would be desirable to easily detect exactly which sensor inside the truck has the problem. Certain solutions to this problem have included using two different radio transmitter/receivers. For example, a first radio transmitter/receiver may be a Bluetooth Low Energy ("BTLE") or similar range wireless radio that has a relatively long range. This radio may be used to transmit values to the sensor receiver. However, the longer range may be a hindrance to isolating the problem. To locate the exact sensor with the problem, a second radio (e.g., a near field communication "NFC" radio) has been suggested for use in isolating the problem. However, using two different radio transmitter/receivers adds to system cost and complexity.

SUMMARY

According to various embodiments, systems and methods for localizing a bad condition in a crowded asset environment are disclosed. In some embodiments, the method may include: providing a plurality of wireless transceivers, wherein each wireless transceiver is operable to provide an adjustable transmission power, each of the plurality of wireless transceivers associated with a sensor monitoring a condition of an asset; operating each wireless transceiver in a long range operating mode which adjusts the transmission power to a high output power; monitoring the conditions of the assets using the long range operating mode with a sensor receiver; communicating an alarm to the sensor receiver by at least one of the plurality of wireless transceiver; transmitting by the sensor receiver a command to all of the plurality of wireless transceivers to switch to a low transmission power output to allow a localization of the item; switching each of the plurality of wireless transceivers to operate in a localization operating mode, wherein the transmission power is set to a low output power; and localizing the sensor generating the alarm.

In some embodiments, the long range operating mode is a Bluetooth Low Energy transmission mode and the localization operating mode is a Bluetooth Beacon mode. In some embodiments, the long range operating mode provides for the highest possible output power of the transmitter and the localization operating mode provides for the lowest possible output power. In such embodiments, the lowest possible output power provides for transmission distance that provides a minimum overlap from other items.

In some embodiments, localizing the sensor generating the alarm may include placing the sensor receiver in physical proximity to each of the plurality of wireless transceivers in order to localize the sensor generating the alarm. In some embodiments, the alarm may include a signal that the sensor associated with the communicating wireless transceiver is malfunctioning.

In some embodiments, the sensor receiver may include a mobile computing device. In alternative embodiments, the sensor receiver may include a stationary portion and a mobile portion. In some embodiments, the condition of the asset may include temperature, pressure, and time.

In various embodiments, localizing a bad condition in a crowded asset environment may include a system for localizing a bad condition in a crowded asset environment. The system may include: a plurality of wireless transceivers, wherein each of the plurality of wireless transceivers is associated with a sensor monitoring a condition of an asset, and wherein each of the plurality of wireless transceivers is operable to provide an adjustable transmission power; and a sensor receiver communicatively coupled to each of the plurality of wireless transceivers, the sensor receiver operable to monitor the conditions of the assets by receiving transmissions from the plurality of wireless transceivers operating in a long range operating mode which adjusts a transmission power to a high output power. Each of the plurality of wireless transceivers may be operable to: in a long range operating mode which adjusts a transmission power to a high output power, communicate monitoring data associated with the condition of the asset to the sensor receiver; in the long range operating mode, communicate an alarm to the sensor receiver; in response to a signal from the sensor receiver, switch to operate in a localization operating mode, wherein the transmission power is set to a low output power; and wherein the sensor receiver is further operable to localize the sensor generating the alarm.

In some embodiments, the long range operating mode is a Bluetooth Low Energy transmission mode and the localization operating mode is a Bluetooth Beacon mode. In some embodiments, the long range operating mode provides for the highest possible output power of the transmitter and the localization operating mode provides for the lowest possible output power. In such embodiments, the lowest possible output power provides for transmission distance that provides a minimum overlap from other items.

In some embodiments, the sensor receiver may be operable to localize the sensor generating the alarm by being in physical proximity to each of the plurality of wireless transceivers in order to localize the sensor generating the alarm. In some embodiments, the alarm may include a signal that the sensor associated with the communicating wireless transceiver is malfunctioning.

In some embodiments, the sensor receiver may include a mobile computing device. In alternative embodiments, the sensor receiver may include a stationary portion and a mobile portion. In some embodiments, the condition of the asset may include temperature, pressure, and time.

In various embodiments, localizing a bad condition in a crowded asset environment may include a system for localizing a bad condition in a crowded asset environment. The system may include: a plurality of assets, wherein each of the plurality of assets is associated with a sensor monitoring a condition of the asset; a plurality of wireless transceivers, each of the plurality of wireless transceivers associated with one or more of the sensors, and wherein each of the plurality of wireless transceivers is operable to provide an adjustable transmission power; wherein each of the plurality of wireless transceivers is operable to: in a long range operating mode which adjusts a transmission power to a high output power, communicate monitoring data associated with the condition of the asset to a sensor receiver; in the long range operating mode, communicate an alarm to the sensor receiver; in response to a signal from the sensor receiver, switch to operate in a localization operating mode, wherein the transmission power is set to a low output power; and in response to a second signal received from the sensor receiver once the sensor generating the alarm has been localized, return to operating in the long range operating mode.

DETAILED DESCRIPTION

Figure 1:
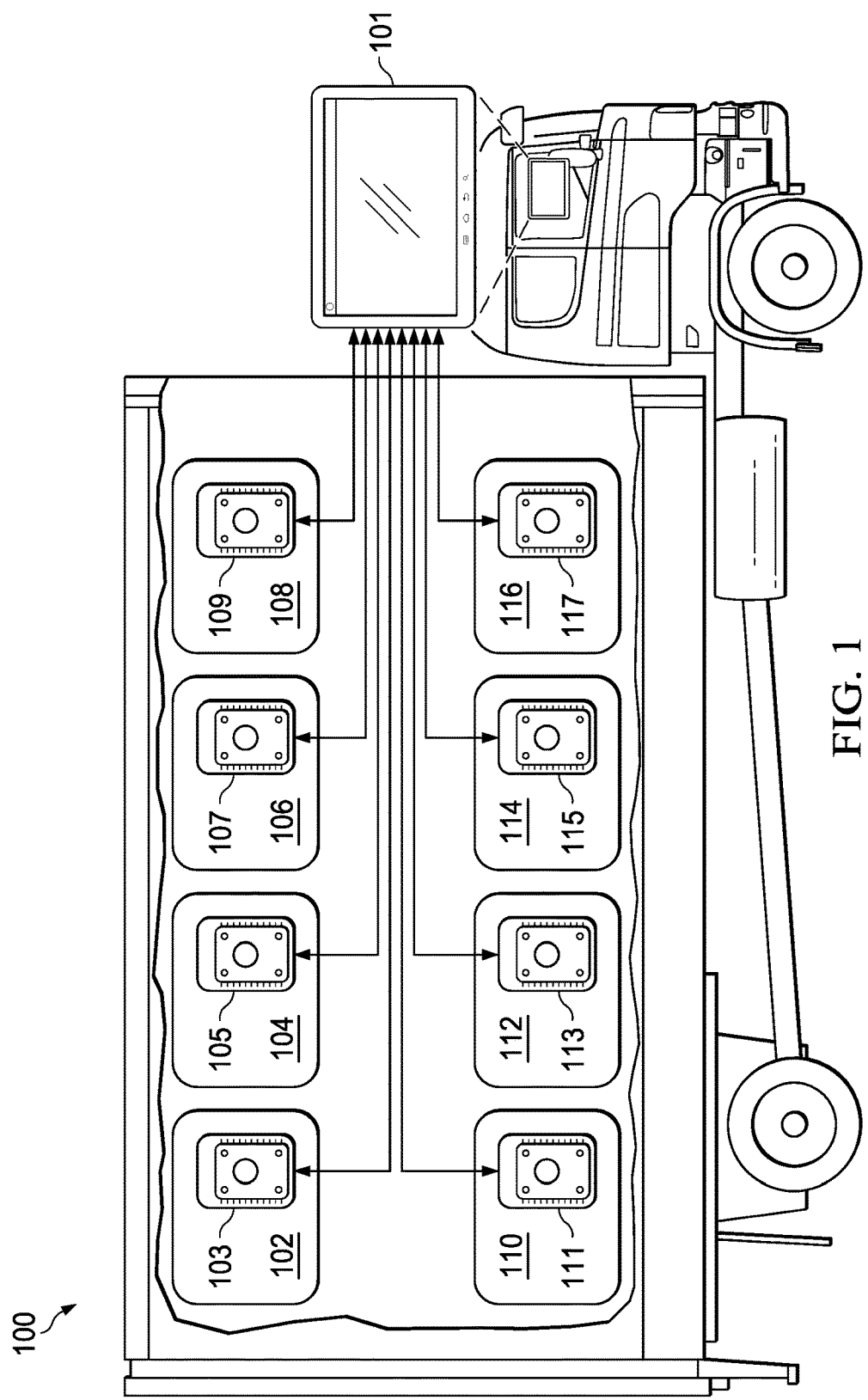
FIG. 1 illustrates an example crowded asset environment including a plurality of assets each with an associated transceiver, in accordance with certain embodiments of the present disclosure.

Certain environments that implement wireless asset tracking experience crowding of assets that may hamper tracking of those assets. For example, applications such as refrigerated trucks shipping perishable goods and pharmaceuticals typically have multiple wireless sensors in the back of the truck. These sensors need to have enough range to send their attributes, such as temperature, humidity, etc. to a sensor receiver. If there is a problem with any one of the transmitted values, it would be desirable to easily detect exactly which sensor inside the truck has the problem. Certain solutions to this problem have included using two different radio transmitter/receivers. For example, a first radio transmitter/receiver may be a Bluetooth Low Energy ("BTLE") or similar range wireless radio that has a relatively long range. This radio may be used to transmit values to the sensor receiver. However, the longer range may be a hindrance to isolating the problem. To locate the exact sensor with the problem, a second radio (e.g., a near field communication "NFC" radio) has been suggested for use in isolating the problem. However, using two different radio transmitter/receivers adds to system cost and complexity. Another suggested solution has been to add a display to each tracked asset (e.g., to show the error condition). However this solution is cost intensive and may not really solve the problem when the number of items is very high. Opening every box to find out which one has problem may also apparently not be a practical solution. There exists a need for a solution without the requirement a two radio system, such as BTLE for long range and NFC for short range to identify the problem.

According to various embodiments, a plurality of assets are present within a tracked asset environment. Each asset may be associated with one or more sensors as well as a wireless transceiver to communicate sensor data to a sensor receiver. In some embodiments, the wireless transceiver(s) may be configured to, by default, communicate with the transceiver's long range capability. If the sensor receiver detects a problem from any of the sensor data, then the sensor receiver may be operable to communicate to the plurality of sensors to convert to a low power transmission mode. In some embodiments, the communication may include an instruction to operate in the low power transmission mode for a set period of time or indefinitely until the item has been found. In the low power transmission mode, one should be able to isolate the problematic device without the need for an additional radio. After the set period time expires or after the item has been localized, the sensor receiver may again communicate with the plurality of sensors to return to the default operating mode with long range communication.

According to various embodiments, the wireless transceiver(s) associated with the plurality of assets may include a Bluetooth Smart transceiver. Generally, Bluetooth Smart may be used in one of two different modes of operation: a higher-power, higher-range "normal" mode, and a lower-power, lower-range "beacon" mode. Although the present disclosure describes the use of Bluetooth Smart in various embodiments, other wireless technologies may be used without departing from the scope of this disclosure, so long as the transceiver is controllable to adjust the output power of its transmitter between a higher setting for a longer range communication and a lower setting for a shorter range communication.

Generally, the normal Bluetooth mode of operation works well for reporting sensor values to a sensor receiver that is within the normal mode of operation's broadcast range (e.g., a few meters). However, the normal mode may be less effective in identifying the location of a particular asset to a few inches, particularly in a crowded asset environment where assets may be only inches apart. In an environment such as multiple boxes in a truck, all units are pretty close to each other and it may be very difficult to find the box of interest by, for example, checking the relative signal strengths of the plurality of transceivers.

According to various embodiments, when an asset needs to be identified in a dense asset/sensor environment, the sensor receiver may communicate to the plurality of transceivers (e.g., when the transceivers "wake up" and report to the smart tablet). This communication may include an instruction to change their operating mode to a lower-power transmission mode. For example, the transceivers may be instructed to change to the Bluetooth Beacon mode (dropping the radio range) for a set period of time or for a time until the item has been found. In that time frame, a user may take the sensor receiver within the shorter range of the transceivers in order to better identify the problem asset. For example, a user may take a smart tablet close to each one of the boxes to identify the one with the problem and address the issue. Due to the low power setting, a sensor receiver may expect reduced interference with the other items due to the transmission radius associated with the lower power communication not overlapping significantly with those of other devices. After the time period expires, the sensor receiver may instruct the transceivers to return to the normal operating mode in order to communicate with long range.

According to various alternative embodiments, a sensor receiver may only instruct the alarm-generating sensor to switch to the Bluetooth Beacon mode. A user may then enter the crowded asset/sensor environment to identify the transceiver operating in the lower power transmission mode.

FIG. 1 illustrates an example crowded asset environment 100 including a plurality of assets 102, 104, 106, 108, 110, 112, 114, 116, each with an associated transceiver 103, 105, 107, 109, 111, 113, 115, 117, in accordance with certain embodiments of the present disclosure. In some embodiments, each transceiver 103, 105, 107, 109, 111, 113, 115, 117 may be communicatively coupled to sensor receiver 101.

In some embodiments, crowded asset environment 100 may be any appropriate environment in which a relatively large number of assets are physically crowded together in such a way as to make differentiation among various sensor readings difficult. For example, crowded asset environment 100 may be a warehouse or a delivery vehicle. In some embodiments, the plurality of assets in crowded asset environment 100 (e.g., assets 102, 104, 106, 108, 110, 112, 114, 116) may be any appropriate assets for which it may be necessary or desirable to track certain features of the asset. For example, an asset may have an associated expiration date. As an additional example, an asset may need to be stored and/or transported under certain conditions (e.g., temperature, pressure, etc.). Accordingly, in various embodiments, each asset (e.g., each asset 102, 104, 106, 108, 110, 112, 114, 116) may have one or more associated sensor(s). Each associated sensor(s) may be tasked with monitoring one or more parameter(s) associated with the asset. For example, an asset may have a temperature sensor, pressure sensor, timer, etc.

In various embodiments, each sensor associated with an asset may communicate various monitored data to a sensor receiver 101. In some embodiments, sensor receiver 101 may be referred to as a "central command device." Sensor receiver 101 may be stationary, (e.g., in a warehouse) or mobile (e.g., in a delivery vehicle). Sensor receiver 101 may be any electronic device appropriate for the crowded asset environment 100 and operable to receive the sensor data from the plurality of sensors. For example, on a delivery vehicle, sensor receiver 101 may be a tablet computer accessible to an operator of the delivery vehicle. Sensor receiver 101 may also be any appropriate portable electronic device (e.g., a smartphone, laptop computer, etc.). As an additional example, in a warehouse environment, a portion of sensor receiver 101 may be stationary (e.g., as part of a centralized monitoring station), while another portion of sensor receiver 101 may be portable (e.g., a tablet computer that a user in the warehouse may take to a troubled asset).

In some embodiments, in normal operation each sensor communicates with sensor receiver 101 using a relatively long range radio frequency ("RF") protocol, e.g., BTLE. For example, a central command device such as a tablet may send a command to all "good" sensors to reduce the transmit output power or to shut off the transmitter for a specific period of time as described in more detail above. For the purposes of this disclosure a "good" sensor may refer to any sensor transmitting monitored data that complies with established acceptable limits of a monitored parameter. Likewise, a "bad" sensor or a "bad" condition may refer to any sensor transmitting monitored data that falls outside of acceptable limits of a monitored parameter. For example, a "good" sensor may refer to a sensor that transmits temperature data for an asset that requires storage at a certain temperature, and the monitored temperature falls within the acceptable range. For example, an asset may need to be stored at between thirty and fifty degrees Fahrenheit. A "good" sensor may be one that identifies the current temperature of the asset as forty-seven degrees, while a "bad" sensor may be one that identifies the current temperature of the asset as fifty-two degrees.

Figure 2:
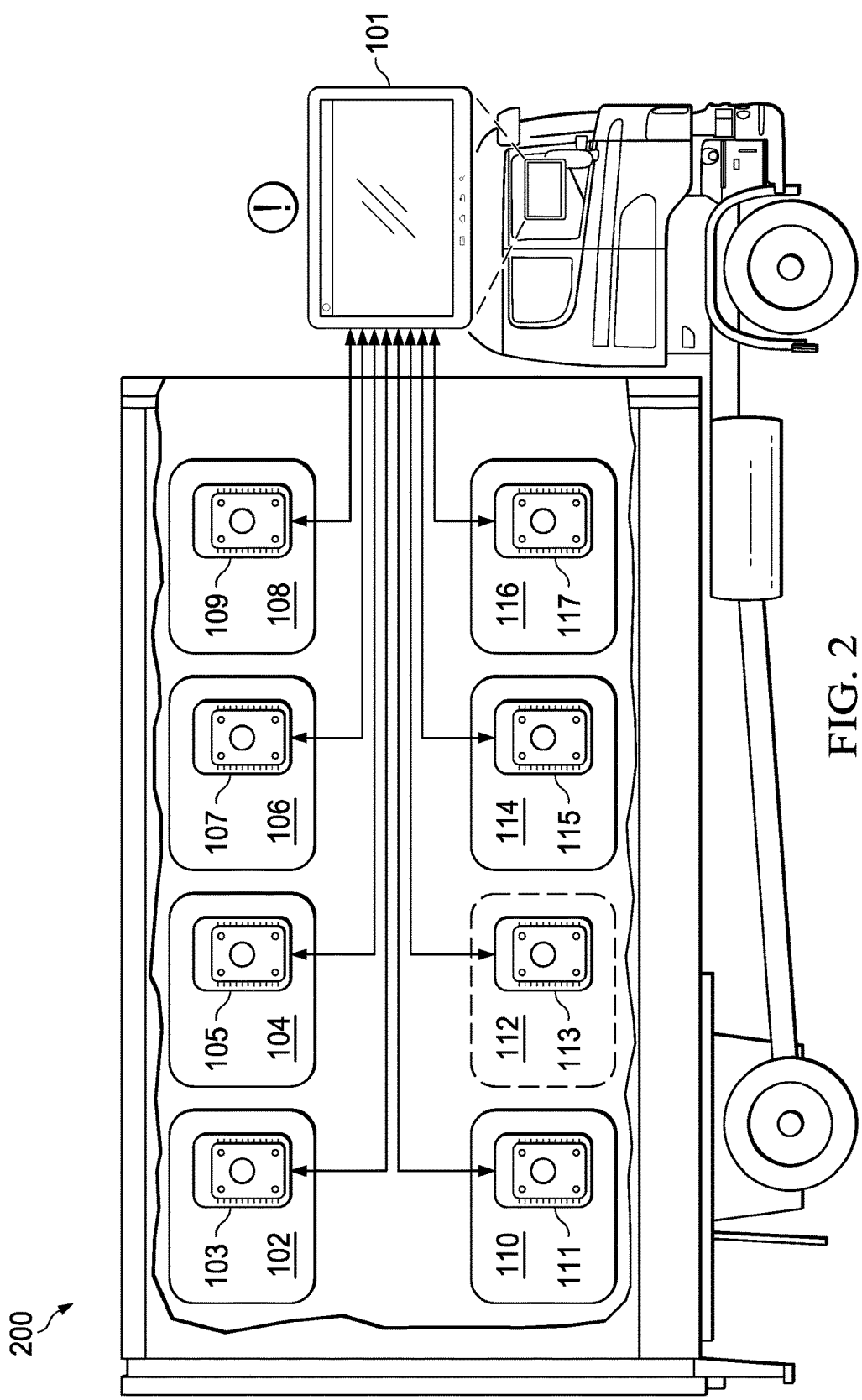
FIG. 2 illustrates an example crowded asset environment in which a sensor associated with a particular asset has identified a bad condition, in accordance with certain embodiments of the present disclosure.

A bad condition may take the form of a sensor failure or an alarm trip exceeding a predefined threshold, or other appropriate notification conditions. Once a bad condition has been detected by the sensor, the respective sensor may alert sensor receiver 101. FIG. 2 illustrates an example crowded asset environment 200 in which a sensor associated with a particular asset has identified a bad condition, in accordance with certain embodiments of the present disclosure. FIG. 2 illustrates an example crowded asset environment 200 including a plurality of assets 102, 104, 106, 108, 110, 112, 114, 116, each with an associated transceiver 103, 105, 107, 109, 111, 113, 115, 117. In some embodiments, each transceiver 103, 105, 107, 109, 111, 113, 115, 117 may be communicatively coupled to sensor receiver 101.

In the illustrative crowded asset environment 200 of FIG. 2, the sensor associated with asset 112 has identified a bad condition. Although a specific, single asset 112 has an associated bad condition in the illustrative crowded asset environment 200, more or different conditions may be found in a given configuration without departing from the scope of the present disclosure. Once the sensor associated with asset 112 has identified a bad condition, transceiver 113 associated with asset 112 may notify sensor receiver 101.

In some embodiments, each asset may have an associated transceiver. For example, each of assets 102, 104, 106, 108, 110, 112, 114, 116 may have an associated transceiver 103, 105, 107, 109, 111, 113, 115, 117, respectively. In some embodiments, the transceiver may be an integral part of the one or more sensor(s) monitoring the associated asset. In the same or alternative embodiments, the sensor device tasked with monitoring the asset may be separate from the transceiver tasked with communicating the monitored data. In the illustrative crowded asset environment 200, the transceiver associated with asset 112 (e.g., transceiver 113) may notify sensor receiver 101 that a bad condition is associated with asset 112.

After receiving this communication, sensor receiver 101 may send a command to all transceivers within the crowded asset environment items to reduce their transmit output power. This may be done for a predetermined time or for an indefinite time period until the user can detect the asset associated with the bad condition. This localization may be performed with a relatively lower power setting of the transceiver. With the lower-power setting, the transmission range of the transceiver is reduced. This lower transmission range may allow a mobile device to more accurately determine the position/location of the alarm-generating item as shown in FIG. 3.

The lower-power transmission mode of the transceivers does not require a different radio transmitter or receiver from the higher-power transmission mode of the transceivers. For example, the lower-power transmission mode may be the "beacon" mode of the BTLE protocol. By making use of the different operating modes of the same RF type, a crowded asset environment monitoring system may reduce costs by only using one radio type.

Figure 3:
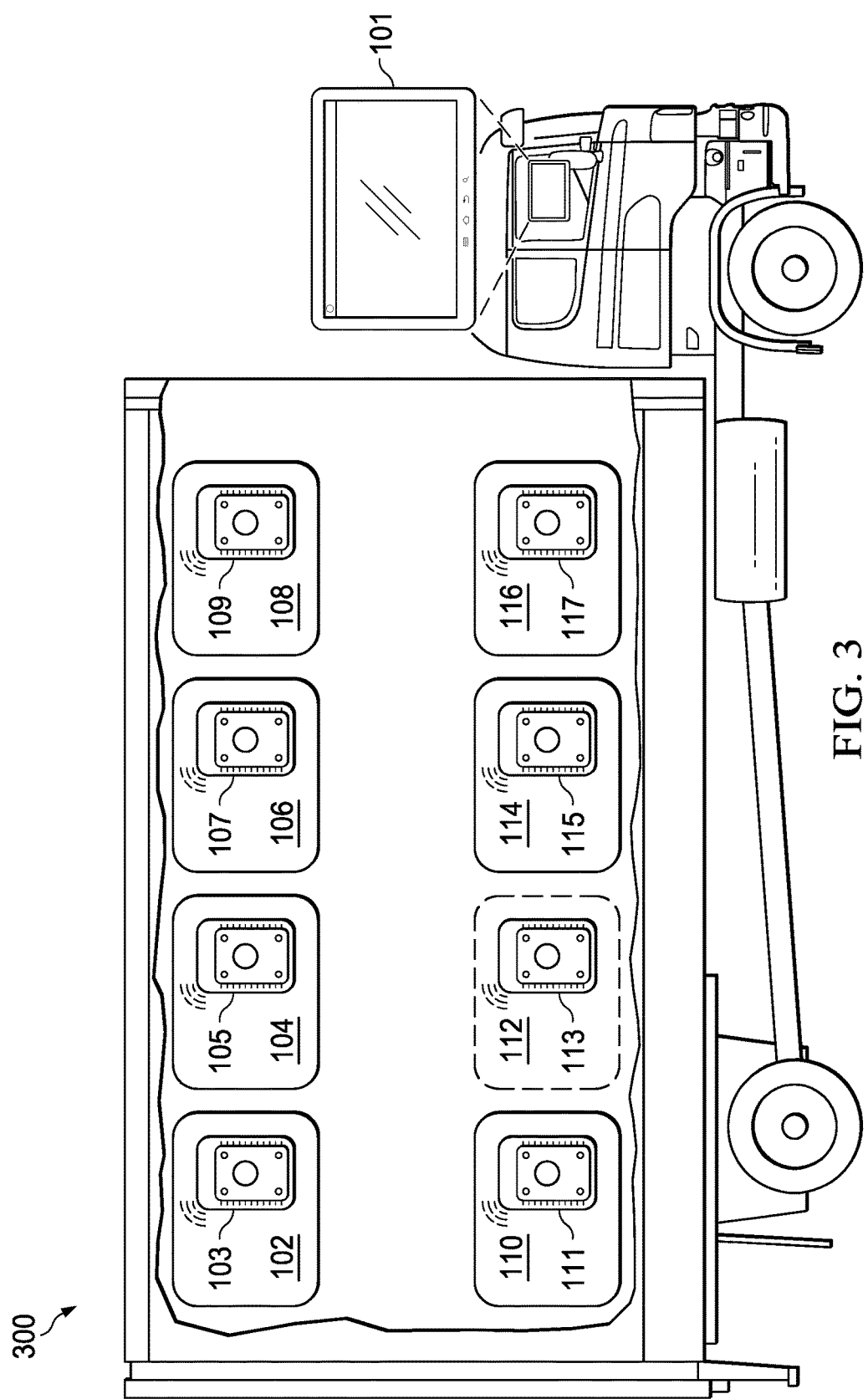
FIG. 3 illustrates an example crowded asset environment in which the sensor receiver is brought within the lower transmission range of a plurality of transceivers associated with a plurality of assets, in accordance with certain embodiments of the present disclosure.

FIG. 3 illustrates an example crowded asset environment 300 in which sensor receiver 101 is brought within the lower transmission range of a plurality of transceivers associated with a plurality of assets, in accordance with certain embodiments of the present disclosure. As described in more detail above and with reference to FIGS. 1-2, crowded asset environment 300 may include a plurality of assets (e.g., assets 102, 104, 106, 108, 110, 112, 114, 116), each with one or more associated sensor(s) and one or more associated transceiver(s) (e.g., transceivers 103, 105, 107, 109, 111, 113, 115, 117). Due to a bad condition sent to sensor receiver 101 from one or more of the transceivers (e.g., from transceiver 113 associated with asset 112), a user may bring a mobile portion of sensor receiver 101 in closer proximity to the plurality of assets in order to determine the physical location of the asset associated with the bad condition. Thus, the sensor receiver 101 (e.g., a tablet computer) can be used itself to localize the respective item that produced the alarm. As described above with reference to FIGS. 1-2, sensor receiver 101 may also include a stationary portion (e.g., a centralized monitoring system in a warehouse) in addition to a mobile portion.

Figure 4:
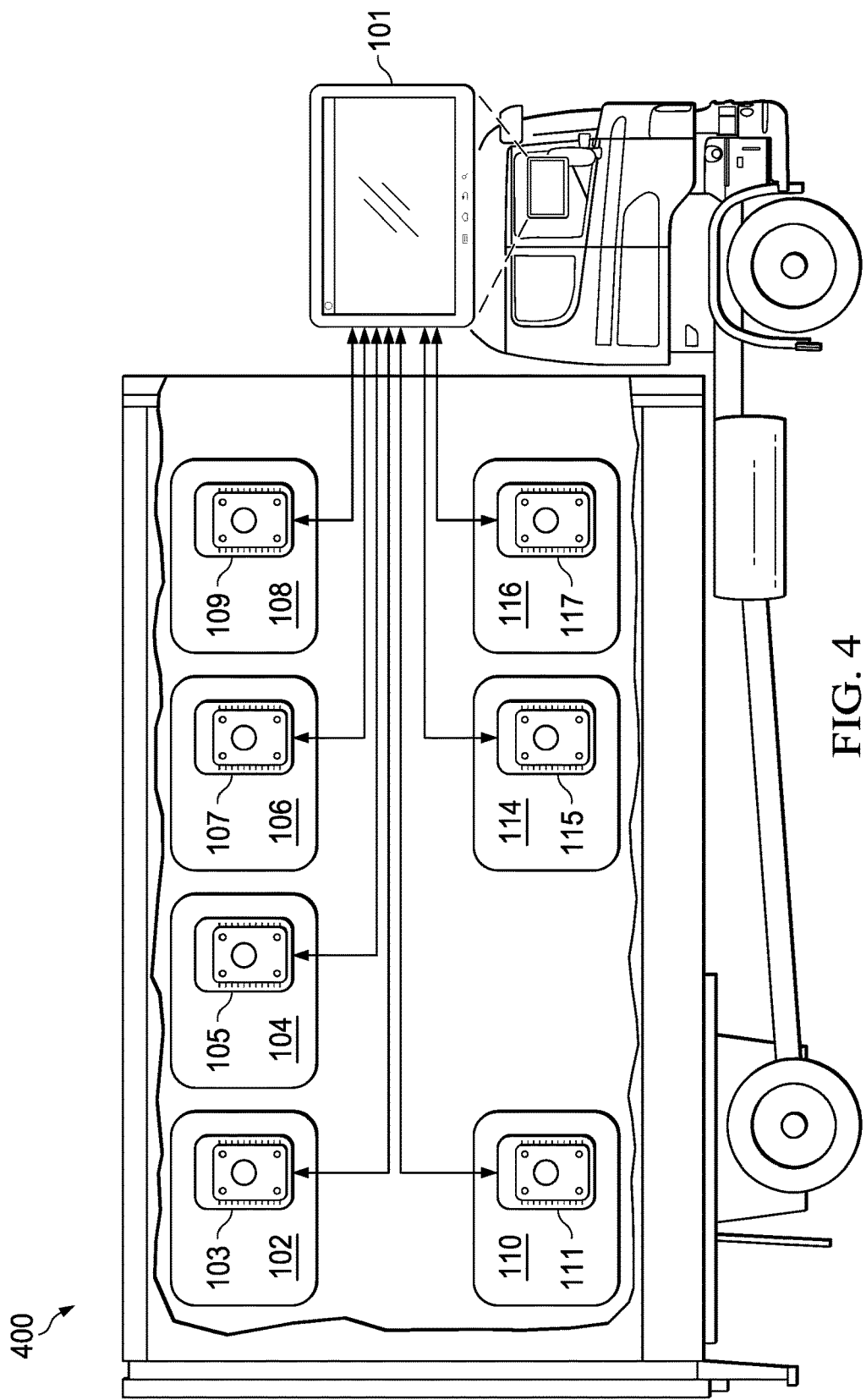
FIG. 4 illustrates an example crowded asset environment in which a bad sensor has been removed from operation and the remaining good sensors returned to a normal mode of operation, in accordance with certain embodiments of the present disclosure.

Once the asset associated with the bad condition is localized, the asset can be removed, repaired, or replaced as necessary depending on its condition. In some embodiments, the transceivers associated with the remaining good sensors may be returned to the normal, higher-power (and thus higher-range) transmission mode. FIG. 4 illustrates an example crowded asset environment 400 in which a bad sensor has been removed from operation and the remaining good sensors returned to a normal mode of operation, in accordance with certain embodiments of the present disclosure.

Crowded asset environment 400 includes a plurality of assets (e.g., assets 102, 104, 106, 108, 110, 114, 116), each with an associated one or more sensor(s), and each sensor having an associated one or more transceiver(s) (e.g., 103, 105, 107, 109, 111, 115, 117), each transceiver being communicatively coupled to sensor receiver 101. In the illustrative crowded asset environment 400, each transceiver 103, 105, 107, 109, 111, 114, 117 operates in a higher-power, higher-range transmission mode (e.g., a "normal" BTLE mode), thus enabling sensor receiver 101 to again receive sensor readings from the plurality of assets.

Although a certain type of crowded asset environment is illustrated in FIGS. 1-4 to aid in understanding, any type of crowded asset environment that requires localization may be used without departing from the scope of the present disclosure. Additionally, although a relatively small number of assets are illustrated in FIGS. 1-4 to aid in understanding, a crowded asset environment may have a larger or smaller number of assets without departing from the scope of the present disclosure. For example, a warehouse may contain a large (e.g., in the hundreds or thousands) number of small boxes that need to be tracked. By contrast, a warehouse may contain a relatively small (e.g., three to five) assets that each require a large number of sensors, thus making localization of a particular sensor (and its associated transceiver) difficult.

The present disclosure addresses the need of sensor localization in a crowded asset environment without adding additional cost to a sensor system. The present disclosure may be applicable in any crowded asset environment where dense sensors are located and there is a need to identify a certain product. Although BTLE is described as an example RF solution, any wireless technology (e.g., WiFi, Bluetooth, SubGHz, 2.4 GHz) may be used that provides for a sub-mode with low power in which exact localization of the transmitter is possible.

What is claimed is:

1. A method for localizing a bad condition in a crowded asset environment, the method comprising:
providing a plurality of wireless transceivers, wherein each wireless transceiver is operable to provide an adjustable transmission power, each of the plurality of wireless transceivers associated with a sensor monitoring a condition of an asset;
operating each wireless transceiver in a long range operating mode which adjusts the transmission power to a high output power;
monitoring the conditions of the assets using the long range operating mode with a sensor receiver;
communicating an alarm to the sensor receiver by at least one of the plurality of wireless transceiver;
based on the alarm received at the sensor receiver, transmitting by the sensor receiver a command to all of the plurality of wireless transceivers to switch to a non-zero, low transmission power output to allow a localization of the item;
switching each of the plurality of wireless transceivers from the long range operation mode directly to a localization operating mode to localize the sensor generating the alarm in the localization operating mode, wherein the transmission power is set to a low output power; and
localizing the sensor generating the alarm using the localization operating mode with transmission power set to the low output power;
wherein transmitting by the sensor receiver the command to all of the plurality of wireless transceivers to switch to the non-zero, low transmission power output to allow localization of the item is based on a received value from one of the wireless transceivers, the received value indicating the condition of the asset, the low transmission power output lower than the high output power.

2. The method according to claim 1, wherein the long range operating mode is a Bluetooth Low Energy transmission mode and the localization operating mode is a Bluetooth Beacon mode.

3. The method according to claim 1, wherein the long range operating mode provides for the highest possible output power of the transmitter and the localization operating mode provides for the lowest possible output power.

4. The method according to claim 3, wherein lowest possible output power provides for transmission distance that provides a minimum overlap from other items.

5. The method according to claim 1, wherein localizing the sensor generating the alarm comprises placing the sensor receiver in physical proximity to each of the plurality of wireless transceivers in order to localize the sensor generating the alarm.

6. The method according to claim 1, wherein the alarm comprises a signal that the sensor associated with the communicating wireless transceiver is malfunctioning.

7. The method according to claim 1, wherein the sensor receiver comprises a mobile computing device.

8. The method according to claim 1, wherein the sensor receiver comprises a stationary portion and a mobile portion.

9. The method according to claim 1, wherein the condition of the asset is selected from the group consisting of: temperature, pressure, or time.

10. A system for localizing a bad condition in a crowded asset environment, the system comprising:
a plurality of wireless transceivers, wherein each of the plurality of wireless transceivers is associated with a sensor monitoring a condition of an asset, and wherein each of the plurality of wireless transceivers is operable to provide an adjustable transmission power; and a sensor receiver communicatively coupled to each of the plurality of wireless transceivers, the sensor receiver operable to monitor the conditions of the assets by receiving transmissions from the plurality of wireless transceivers operating in a long range operating mode which adjusts a transmission power to a high output power; and wherein each of the plurality of wireless transceivers is operable to:
- in a long range operating mode which adjusts a transmission power to a high output power, communicate monitoring data associated with the condition of the asset to the sensor receiver;
- in the long range operating mode, communicate an alarm to the sensor receiver;
- in response to the alarm and a signal from the sensor receiver, switch directly from the long range operation mode to a localization operating mode to localize the sensor generating the alarm in the localization operating mode, wherein the transmission power is set to a non-zero, low output power; and
- wherein the sensor receiver is further operable to localize the sensor generating the alarm using the localization operating mode with transmission power set to the low output power;
- wherein the signal from the sensor receiver is based on a received value from one of the wireless transceivers, the received value indicating the condition of the asset, the low transmission power output lower than the high output power.

11. The system according to claim 10, wherein the long range operating mode is a Bluetooth Low Energy transmission mode and the localization operating mode is a Bluetooth Beacon mode.

12. The system according to claim 10, wherein the long range operating mode provides for the highest possible output power of the transmitter and the localization operating mode provides for the lowest possible output power.

13. The system according to claim 12, wherein lowest possible output power provides for transmission distance that provides a minimum overlap from other items.

14. The system according to claim 10, wherein localizing the sensor generating the alarm comprises placing the sensor receiver in physical proximity to each of the plurality of wireless transceivers in order to localize the sensor generating the alarm.

15. The system according to claim 10, wherein the alarm comprises a signal that the sensor associated with the communicating wireless transceiver is malfunctioning.

16. The system according to claim 10, wherein the sensor receiver comprises a mobile computing device.

17. The system according to claim 10, wherein the sensor receiver comprises a stationary portion and a mobile portion.

18. The system according to claim 10, wherein the condition of the asset is selected from the group consisting of: temperature, pressure, or time.

19. A system for localizing a bad condition in a crowded asset environment, the system comprising:
- a plurality of assets, wherein each of the plurality of assets is associated with a sensor monitoring a condition of the asset;
- a plurality of wireless transceivers, each of the plurality of wireless transceivers associated with one or more of the sensors, and wherein each of the plurality of wireless transceivers is operable to provide an adjustable transmission power;
- wherein each of the plurality of wireless transceivers is operable to:
  - in a long range operating mode which adjusts a transmission power to a high output power, communicate monitoring data associated with the condition of the asset to a sensor receiver;
  - in the long range operating mode, communicate an alarm to the sensor receiver;
  - in response to the alarm and a signal from the sensor receiver, switch directly from the long range operation mode to a localization operating mode to localize the sensor generating the alarm in the localization operating mode, wherein the transmission power is set to a non-zero, low output power;
  - localize the sensor generating the alarm using the localization operating mode with transmission power set to the low output power; and
  - in response to a second signal received from the sensor receiver once the sensor generating the alarm has been localized, return to operating in the long range operating mode;
- wherein the signal from the sensor receiver is based on a received value from one of the wireless transceivers, the received value indicating the condition of the asset, the low transmission power output lower than the high output power.

20. The system according to claim 19, wherein the long range operating mode is a Bluetooth Low Energy transmission mode and the localization operating mode is a Bluetooth Beacon mode.

* * * * *